3,794,607
AQUEOUS ACRYLIC RESIN ELECTRODEPOSITION COATING COMPOSITION CONTAINING A MIXTURE OF ORGANIC AMINES
Seiichi Torimitsu and Masao Takahashi, Ohtsu, Japan, assignors to Toray Industries, Inc., Tokyo, Japan
No Drawing. Continuation of abandoned application Ser. No. 812,437, Apr. 1, 1969. This application Apr. 12, 1971, Ser. No. 133,330
Claims priority, application Japan, Apr. 1, 1968, 43/20,971
Int. Cl. C08f 15/40, 45/60
U.S. Cl. 260—29.6 TA      4 Claims

ABSTRACT OF THE DISCLOSURE

Composition containing an acrylic resin having carboxylic groups, at least one organic amine having a "lower" dissociation degree of above 6 pKb, and at least one organic amine having a "higher" dissociation degree, i.e. its pKb is less than that of the above-described organic amine by two or more, is suitable for electrodeposition coating to yield an excellent coating film.

This is a continuation of Ser. No. 812,437, filed Apr. 1, 1969, now abandoned.

BACKGROUND OF THE INVENTION

The present invention relates to an acrylic coating composition for electrodeposition. Many compositions for electrodeposition are well known. Resins with a carboxyl group and which are aqueous-solubilized with various amines, ammonium materials, and other bases and which are often mixed with other resins, pigments, and other additives, are commonly used.

In general, basic resins of an acrylic composition used for electrodeposition employs a resin as the base which results from the copolymerization of a copolymerizable acid, such as acrylic acid, methacrylic acid or itaconic acid, with acrylate esters, methacrylate esters, styrene, or vinyl toluene, etc. by radical polymerization. If necessary, though the resin may occasionally be co-condensated or reacted with various resins or materials, and this is the situation in most cases, the resin can be water solubilized by neutralizing a part or all of the carboxylic acid therein with various amines, ammonia, or other bases. However, in practical usage, the thermosetting acrylic resin composition used for electrodeposition which employs these acrylic resins as the base has the defects common to the acrylic compositions, i.e., poor flowability at the curing temperature with the resulting poor surface characteristics such as "orange peel." (At least in comparison with the use of thermosetting alkyd or oily compositions.)

One conventional method for improving the surface appearance of such a coating is to add a high boiling point solvent, plasticizer, etc. thereto. However, the addition of such materials is not preferred, since they soften the coating film.

An object of the present invention is to improve the surface appearance acrylic coating composition without damaging the characteristics of coating, that is, to provide an acrylic coating composition for use in an electrodeposition coating process which is capable of providing a coating film having an excellent surface appearance. This is basically accomplished by improving a flowability of coating at the high temperature.

SUMMARY OF THE INVENTION

The composition of the present invention is an acrylic coating composition useful for electrodeposition which contains an acrylic resin having a carboxylic group, at least one organic amine compound having a "lower" dissociation constant of above 6 pKb, and at least one organic amine compound having a "higher" dissociation constant, i.e., less than that of the above-described organic amine compound in its pKb by more than two (as a water solubilizing agent for the above-described resin pKb=$\log_{10}$ Kb; Kb: dissociation constant of amine).

DETAILED DESCRIPTION OF PREFERRED EMBODIMENTS

Any method may be selected for the addition of the organic amine compound. That is, the basic resin of the composition is prepared by polymerization and condensation, and, subsequently, upon water-solubilizing the resin, the above-described two amines may be added simultaneously. Other amines may be added before or after or during addition of the water-solubilizing agent. Also, when employing the composition in electrodeposition coating, the composition can be prepared in the vessel used for coating by adding the above-described two amines thereto in any order.

The organic amine compounds which can be employed in the present invention are exemplified as follows (remembering that pKb=$\log_{10}$ Kb, with Kb being the dissociation constant of the amine).

| Organic amine compound of "higher" dissociation constant: | pKb |
|---|---|
| Triethylamine | 3.4 |
| Trimethylamine | 4.2 |
| Tri-n-propylamine | 3.4 |
| Tributylamine | n 3.1, iso 3.7 |
| Diethylamine | 4.0 |
| Diethylaminoethanol | 3.5–4.5 |
| Triethanolamine | 6.2 |
| Methylamine | 3.4 |
| Ethylamine | 3.4 |
| n-Propylamine | 3.4 |
| Hexylamine | 3–4.5 |
| Morphorine | 3–5.0 |
| Piperidine | 3–4.5 |
| Dimethylamine | 3.1 |
| Diethylamine | 3.1 |
| D-n-propylamine | 3.0 |

Primary and secondary amines are not as preferable because of the possibility of their injuring the stability of the system.

| Organic amine compound of "lower" dissociation constant: | pKb |
|---|---|
| α-Picoline | 8.8 |
| β-Picoline | 8.0 |
| γ-Picoline | 8.3 |
| 2,6-lutidine | 7.3 |
| 2,4-lutidine | 7.2 |
| 3,5-lutidine | 7–7.5 |
| N-methylmorpholine | 6.3 |
| Pyridine | 8.8 |
| Quinoline | Above 6.5 |

The pKb of the organic amine compound having higher dissociation constant is preferably 3.0 to 6.3, and the pKb of that having lower dissociation constant is preferably 6 to 9.

The amounts of organic amine compound to be added vary depending upon the kind of resin and the ratio of resin to composition.

The organic amine compound of lower dissociation degree scarcely affects the water-solubilization of the resin and the pH of the composition. These parameters are substantially determined by the organic amine compound of higher dissociation degree. Therefore, the amount of organic amine compound of higher dissociation degree used should be added so that water-solubilization is sufficient and the pH is in the range of 6 to 10 (considering the performance of the coating finally obtained) and from 0.3 to 1.2 equivalent amounts based on the carboxylic acid contained in the acrylic resin are commonly used. When below 0.3 equivalent are used, the pH of the system becomes too high to be suitable for electrodeposition. The organic amine compound of low dissociation degree, which scarcely affects the pH in practical commercial usage is employed in an amount of from 0.1 to 30%, preferably 0.2 to 20%, by weight, of the solid content of the acrylic composition. The effect of improving the smoothness of surface is not recognized in an amount below 0.1% by weight, and also, with above 30% by weight, the electrodeposition characteristics will be changed, and the electrodeposited film is softened, that is, for example, in water-washing before baking a water trace will remain to damage the surface of the coating film.

As the base of the composition, acrylic resins are preferably employed which are prepared by polymerizing 3 to 20 parts, by weight of a carboxylic acid having a co-polymerizable double bond, such as, acrylic acid, methacrylic acid, itaconic acid, etc., 4 to 97 parts, by weight, of an ester thereof, and 0 to 40 parts, by weight, of a material co-polymerizable therewith, for example, acrylamide, styrene, vinyl toluene, etc.

An acrylic coating composition may be manufactured by water-solubilizing the above-described acrylic resin and adding various additives thereto, although the water-solubilization can be carried out after the addition of the various additives. The additives used include various resins such as melamine resins, epoxide resins, etc.; various pigments, various organic solvents, and plasticizers, etc. These are added, usually only if necessary.

The composition of the present invention can be employed in any conventional method commonly well known as coating methods utilizing the electrophoresis phenomenon, that is, the so-called electrodeposition coating method.

Generally, the composition is diluted to a 3 to 25% by weight solid content using water as a medium, and maintained at a temperature of 5 to 50° C. The material to be coated is connected to the positive terminal of an electric source and (usually) the vessel itself is made into the cathode. The cathode can also be provided in the vessel per se, and the material to be coated can be immersed therein, or, while immersing, 30 to 300 volts of director pulsating current are passed through the system. The coated material is then removed and, after being treated appropriately, if necessary, heated to a suitable temperature (usually 80 to 400° C.) to cure the composition. This is the well known general electrophoretic deposition method. The material to be coated is usually an electroconductive material as a metal such as aluminum, zinc, iron, copper, various alloys, etc.; a surface processed metal such as almite; or zinc phosphate treated iron, etc. Actually, the body of a car, a car wheel, household electrical articles, etc. are typically treated. In the coating film obtained by using the coating composition for an electro-deposition coating according to the present invention, not only is the flowability at curing excellent, but the resin is not softened (in comparison with the case of using a plasticizer).

The effect of the present invention is considered to be attributable to the fact that the amine of lower dissociation degree not only functions in a similar manner to a solvent, but also serves to appropriately "slow down" the acid catalyst reaction which is a curing reaction of such resins. This thereby gives time enough for the composition to flow sufficiently and to give a smooth coating surface during curing.

The present invention will be illustrated with the following examples in which "part" means "part by weight."

EXAMPLE 1

16 parts of styrene, 58 parts of butyl acrylate, 15 parts of hydroxyethyl methacrylate, 11 parts of itaconic acid, 60 parts of isopropylalcohol (as a solvent) and 1.5 parts of benzoylperoxide (as a polymerization initiator) were heated, under reflux, with stirring, and were polymerized. Two parts of pyridine were added thereto and triethylamine was further added so that the pH of the aqueous resin solution (10% by weight) was 8.5. Hexamethoxy resin melamine [hexakis(methoxymethyl)melamine], Cymel 300 (trademark), was added thereto so that the solid content ratio of acrylic resin to melamine was 7 to 3. Water was then added to adjust the solid content to 10%, by weight. This liquid was maintained at 28° C. and was electrodeposited on a zinc phosphate treated iron plate under the conditions of 50 volts for one minute. After washing with water, the coated member was cured at 150° C. for 20 minutes to obtain a coating material having a smooth surface. The coating was H grade in pencil hardness and was excellent in alkali resistance, water resistance and various other physical properties.

The results of various experiments to determine the effects of substituting other substances for pyridine and varying the water-solubilizing agent are shown in Table 1. The resin of Example 1 was used.

TABLE 1

| | No. 1[1] | No. 2[2] | No. 3[3] | No. 4[4] | No. 5[5] |
|---|---|---|---|---|---|
| Water-solubilizing agent | Triethylamine | Triethylamine | Triethylamine | Triethylamine | Triethylamine. |
| Additive | Pyridine | None | Di-octylphthalate | n-Butanol | None. |
| Amount of additive, part/100 parts of acryl | 2 | | 10 | 50 | |
| Surface smoothness | Excellent | Poor | Fair | Fair | Poor. |
| Hardness (pencil) | H | H | 2B | H | H. |
| Alkali resistance, 1% NaOH for 1 day | Excellent | Fair | Poor | Fair | Fair. |
| Impact strength, 500 g./cm. (½ in.) | 50 | 50 | 50 | 50 | 50. |
| Coating voltage | 50 | 50 | 20 | 15 | 50. |

[1] The composition of the present invention.
[2] Using only the water solubilizing agent as an additive.
[3] Using a plasticizer as an additive.
[4] Using a solvent as an additive.
[5] Using two organic amines in which the pKb difference is less than two.

NOTE.—Coating time 1 minute.

From Table 1, it is clear that the composition of the present invention shows superior properties.

The impact strength was determined by dropping a 500 g. body having an end ½ inch in diameter on the resin coating film and then measuring the maximum dropping height from which the coating surface was not damaged.

EXAMPLE 2

A zinc phosphate treated soft steel plate was coated by the same method as in Example 1, but with substituting 0.5 part, 2 parts, 5 parts, 10 parts and 20 parts of γ-picoline for 2 parts of pyridine. Although in all cases coatings having a glossy surface were obtained, 10 parts of γ-picoline was best; 20 parts of γ-picoline was almost equal; and for 5 parts, 2 parts and 0.5 part of γ-picoline, the smoothness of the surface changed, and in 0.5 part of γ-picoline unevenness was observed. The change was most noticeable in the order given.

EXAMPLE 3

An acrylic resin prepared by copolymerizing 10 parts of acrylic acid, 30 parts of methyl methacrylate, 50 parts of butyl acrylate and 10 parts of hydroxyethyl methacrylate in n-butanol having added 0.5 part of n-dodecylmercaptane and 1.0 part of azobisisobutyronitrile was water-solubilized with 10 parts of diethyl-aminoethanol. Nikalac MW-22 (trademark) [a methoxy melamine resin, soluble in isopropyl alcohol and water, having a hue of below 30 and a Gardner viscosity of below A] was added as a melamine thereto at a ratio of 6 parts of acrylic resin to 4 parts of melamine. Titanium dioxide Taipaque R550 (trademark) [having a purity of 96.0%, a particle diameter of 0.25 to 0.40, a specific gravity of 4.2, a tinting strength of 1,700 and an oral absorption value of from 20 to 22] was dispersed in this resin solution at a ratio of 1 part of pigment to 3 parts of resin. This composition was diluted with water to a solid content to 15% by weight. At this time, the pH was 8.2. 100 liters of this composition was placed into a rectangular stainless steel tank provided with an overflow recurring apparatus. The vessel was connected to the cathode terminal of an electric source. A zinc phosphate treated iron rectangular article to be coated was connected to the anode terminal of an electric source and was immersed into the composition, care being taken not to contact the article with the vessel. After adding 4% pyridine based on the solid content of composition, the composition was electrodeposited under the condition of 150 volts for one minute at 30° C. After washing with water, the coated article was cured at 160° C. for 20 minutes. Upon comparison with the case of treatment in the same manner without adding pyridine on the surface state of coating, adding pyridine resulted in the coating surface being very smooth. In the case of not adding pyridine, the surface was very uneven.

EXAMPLE 4

8 parts of itaconic acid, 20 parts of methacrylic acid, 50 parts of butyl acrylate, 14 parts of styrene, and 8 parts of hydroxypropyl methacrylate were copolymerized in 80 parts of isopropyl alcohol under reflux using 0.5 part of azobisisobutyronitrile as an initiator. To this resin solution 3 parts of 3.5-lutidine and 6 parts of triethylamine were added, and water was added thereto to adjust the resin content to 50% at the time of heating to 110° C. 10 parts of Taipaque R550 (trademark) and 1 part of Mitsubishi carbon 100 (trademark) [carbon black] were added to 100 parts of this water-solubilized resin, and they were milled on a roll. The mixture was then diluted with water and adjusted in its pH with diethylaminoethanol so that the solid content was 10% and the pH was 9.0. The composition obtained was electrodeposited onto a zinc phosphate treated iron plate at 30° C. under the condition of 60 volts for two minutes. The plate was then cured at 190° C. for 30 minutes to obtain a glossy coating having a smooth surface.

EXAMPLE 5

1 part of triethanolamine and 7 parts of triethylamine were added to the acrylic resin obtained in Example 3 to water-solubilize the resin. Further 4 parts of 3.5-lutidine were added thereto, and then water was added thereto to adjust the resin content to about 50%, by weight. Thereafter, the resin was blended with Nikalac MX-40 (trademark [Nikalac MX-40 is a methoxybutoxy melamine resin having a Gardner viscosity of U-Y; a specific gravity of 1.05-1.25 at 20° C. and an acid value not exceeding 0.5] and Taique R550 (trademark) at a ratio of the acrylic resin to Nikalac MX to Taipaque R550 of 7 to 3 to 4. The mixture was milled on a three-roll mixer. The composition was diluted with water to a 15% by weight solid content, and, thereafter, was adjusted in its pH with triethylamine to 9.0. The composition was electrodeposited on an iron plate treated with Bondelite #144 (trademark, zinc phosphate treating agent) at 25° C. under 100 volts. After washing with water, the article was cured at 180° C. for 20 minutes to obtain a smooth coating having a gloss of about 75% at 60° mirror reflection. The surface of the coating showed good adhesiveness (100/100 in the cross-line test of the JIS), excellent impact strength (500 g., 50 cm., ½ inch), and excellent alkali resistance (immersion in 1% NaOH for one day).

In contrast, for the case of treatment in the same manner without adding 3.5-lutidine, the electrodeposited coating film tends to peel off under water washing, and the surface of coating obtained was very uneven so that its gloss was below 40% at 60° mirror reflection. The deposition time was two minutes, for both cases.

To further aid in an understanding of the present invention, when the acrylic polymerization takes place, usually a temperature within the range 50–170° C., is most preferred, this being about the boiling point of the solvent. Normal pressure is most preferably utilized, and the time of reaction may be from about 1 to about 72 hours.

To further expand upon the present invention, illustrative esters of a carboxylic acid having a co-polymerizable double bond, which enter into the acrylic polymerization, are alkyl esters having from 1 to 18 carbon atoms, such as methyl methacrylate, methyl acrylate, ethyl acrylate, butyl acrylate, propyl methacrylate, octyl acrylate and the like.

What is claimed is:
1. An acrylic coating composition for electrodeposition consisting essentially of:
   (1) an acrylic resin prepared by polymerizing from 3 to 20 parts by weight of a carboxylic acid selected from the group consisting of acrylic acid, methacrylic acid, and itaconic acid, from 4 to 97 parts by weight of an alkyl ester of said carboxylic acid having from 1 to 18 carbon atoms and from 0 to 40 parts by weight of a material selected from the group consisting of acrylamide, styrene, and vinyl toluene.
   (2) from 0.1 to 30 percent by weight, based on the weight of total solids in the composition, of a first organic amine compound selected from the group consisting of pyridine, picolines, lutidines and quinolines, and
   (3) from 0.3 to 1.2 equivalents, to the carboxyl groups in the acrylic resin, of a second organic amine compound selected from the group consisting of mono-, di-, and tri-alkylamines, wherein the alkyl moiety of said alkyl amines has from 1 to 4 carbon atoms, diethylaminoethanol, triethanolamine, morpholine and piperidine,
said composition being diluted to a solids content of from 3 to 25 percent by weight, with water.

2. The acrylic coating composition of claim 1 wherein said acrylic resin is selected from the group consisting of a copolymer of styrene, butyl acrylate, hydroxyethylmethacrylate and itaconic acid, a copolymer of acrylic acid, methylmethacrylate, butyl acrylate and hydroxyethylmethacrylate, and a copolymer of itaconic acid, methacrylic acid, butyl acrylate, styrene and hydroxypropylmethacrylate.

3. The acrylic coating composition of claim 1 wherein said alkyl ester is selected from the group consisting of methylmethacrylate, methyl acrylate, ethyl acrylate, butyl acrylate, propylmethacrylate, and octyl acrylate.

4. The acrylic coating composition of claim 1 wherein said first organic amine compound is present in an amount of from 0.2 to 20%, by weight, based on the weight of total solids in the composition.

References Cited

UNITED STATES PATENTS

| | | | |
|---|---|---|---|
| 3,403,088 | 9/1968 | Hart | 260—29.4 UA |
| 2,918,391 | 12/1959 | Hornibrook | 260—29.4 UA |
| 3,218,283 | 11/1965 | Miller | 260—32.4 X |
| 3,506,601 | 4/1970 | Sekmakas | 260—29.6 N UX |

ROBERT F. WHITE, Primary Examiner

J. B. LOWE, Assistant Examiner

U.S. Cl. X.R.

204—181; 260—29.6 N